J. R. PAYSON.
FASTENERS FOR THE MEETING-RAILS OF SASHES.
No. 178,666. Patented June 13, 1876.
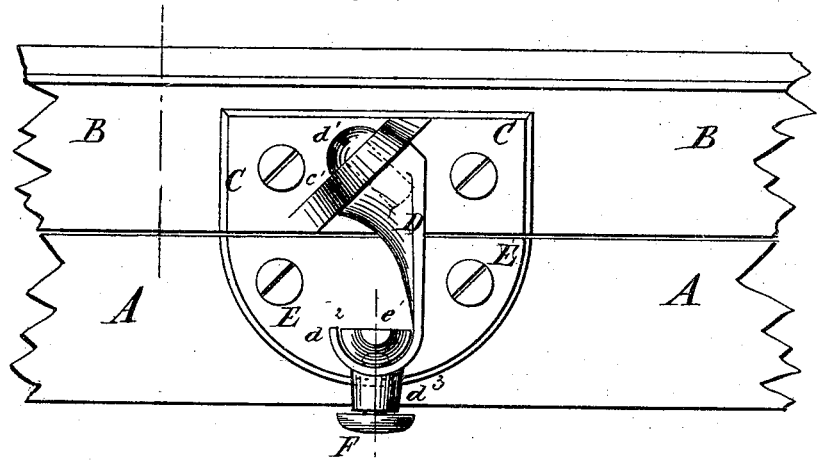
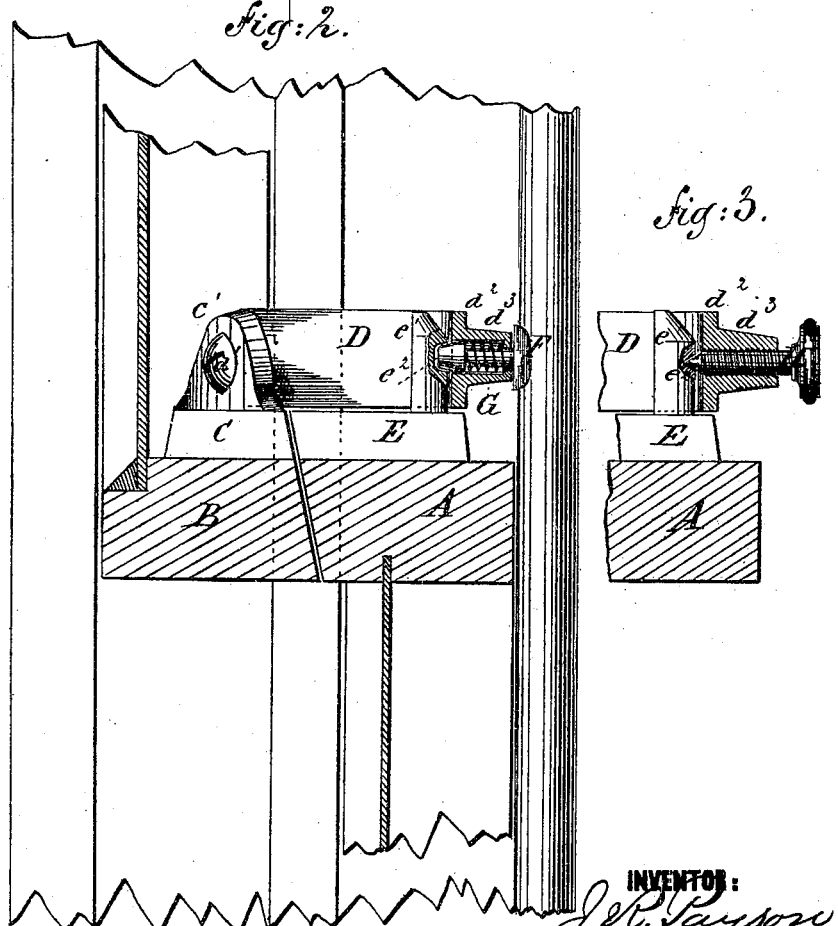
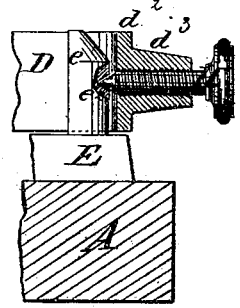
WITNESSES:
INVENTOR:
BY
ATTORNEYS.

UNITED STATES PATENT OFFICE.

JOSEPH R. PAYSON, OF CHICAGO, ILLINOIS.

IMPROVEMENT IN FASTENERS FOR THE MEETING-RAILS OF SASHES.

Specification forming part of Letters Patent No. 178,666, dated June 13, 1876; application filed May 9, 1876.

*To all whom it may concern:*

Be it known that I, JOSEPH R. PAYSON, of Chicago, Cook county, State of Illinois, have invented a new and Improved Window-Sash Lock, of which the following is a specification:

In the accompanying drawing, Figure 1 is a top view of my improved device, shown as locking the sashes of a window. Fig. 2 is a side view of the same, partly in section, to show the construction; and Fig. 3 is a detail section, showing a modification of the device.

The object of this invention is to improve the construction of the window-sash lock for which Letters Patent No. 171,694 were granted to me January 4, 1876, to make it more secure against being opened from the outside of the window, and to draw the sashes together more firmly.

My invention consists in the combination of a bolt and spring, a thumb-screw, or other suitable fastening, with the barrel or collar upon the hook of the locking-arm, and with the flange of the plate attached to the rail of the upper sash, and with the recess in the pin of the plate attached to the rail of the lower sash, as hereinafter more fully described and definitely claimed.

In the drawing, A and B represent the meeting-rails of the sashes. C is the plate attached to the rail B. D is the locking-arm, which is pivoted to a lug, $c'$, formed upon the plate C by a screw or pin, $d^1$. $d^2$ is the hook formed upon the outer end of the arm D, to hook upon the pin $e^1$, formed upon or attached to the plate E, attached to the rail A. $e^2$ is a recess or hole formed in the forward side of the pin $e^1$, to receive the point of the bolt F, that passes through the hook $d^2$, and through a collar or barrel, $d^3$, formed upon or attached to the forward or convex side of the said hook $d^2$. When a spring-bolt, F, is used, its shank is turned down, or made smaller, to form a space for a coiled spring, G, and to form a shoulder for the inner end of the said spring to rest against. The outer end of the spring G rests against a shoulder formed upon the outer part of the inner surface of the collar or barrel $d^3$. When a screw, H, is used, the said screw and the cavity of the collar $d^3$ are made of uniform size, and have screw-threads cut in them. With this construction, the end of the bolt F or screw H enters the recess $e^2$ of the pin $e^1$, and thus draws the sashes together more firmly, and prevents the locking-arm D from being raised without withdrawing the bolt F or screw H, by means of the thumb-piece attached to its outer end, and which, from its position, can only be operated upon the inside of the window.

Having thus described my invention, what I claim as new, and desire to secure by Letters Patent, is—

1. An improved sash-lock, in which the locking-arm is pivoted at or nearly at an angle of forty-five degrees with the length of the meeting-rails of the sash, and secured by suitable fastening devices, as shown and described.

2. The combination of the bolt F and the spring G with the barrel or collar $d^3$ upon the hook $d^2$ of the locking-arm D, and with the flange $c'$ of the plate C, and with the recess $e^2$ in the stud or pin $e^1$ of the plate E, substantially as herein shown and described, for the purpose set forth.

JOSEPH R. PAYSON.

Witnesses:
EDWARD PAYSON,
W. F. MAIN.